United States Patent [19]
Arroubi

[11] Patent Number: 5,410,236
[45] Date of Patent: Apr. 25, 1995

[54] DEVICE TO REGULATE THE SPEED OF AN ELECTRIC MOTOR AND ITS METHOD OF OPERATION

[75] Inventor: Mustafa Arroubi, Lully, France

[73] Assignee: Moulinex (Societe Anonyme), Bagnolet, France

[21] Appl. No.: 79,519

[22] Filed: Jun. 21, 1993

[30] Foreign Application Priority Data

Jun. 22, 1992 [FR] France .................. 92 07596

[51] Int. Cl.$^6$ ............................................. H02P 6/02
[52] U.S. Cl. .................... 318/800; 318/810; 318/812; 318/818; 388/936; 388/937
[58] Field of Search .................... 318/800–832, 318/138, 139, 254, 439, 600–648, 599; 388/800–899, 936, 937

[56] References Cited

U.S. PATENT DOCUMENTS

| | | |
|---|---|---|
| 3,570,390 | 3/1971 | Jordan et al. |
| 4,130,785 | 12/1978 | Penet ................... 388/902 |
| 4,387,421 | 6/1983 | Zach et al. ............ 318/811 |
| 4,481,457 | 11/1984 | Zach et al. ............ 318/803 |
| 4,855,661 | 8/1989 | Okamoto ............... 318/807 |
| 4,926,105 | 5/1990 | Mischenko et al. .... 318/800 |
| 5,194,794 | 3/1993 | Shamoto ............... 318/603 |

FOREIGN PATENT DOCUMENTS 2564998 11/1985 France .
61-112586 5/1986 Japan .

*Primary Examiner*—Paul Ip
*Attorney, Agent, or Firm*—Young & Thompson

[57] ABSTRACT

Digital device to regulate the speed of an electric motor having a commutating element mounted in series with the motor at the terminals of an A.C. distribution network. A duration of an on-state of the commutating element defines values corresponding to desired reference speeds. The digital device includes a tachometer sensor connected with the motor which emits pulses indicative of the speed of the motor, a microcontroller having an oscillator, a first counter whose count is tied to at least one period of the pulses to calculate an actual speed of the motor, a memory containing desired reference speed values, a comparator to compare the desired reference speed with the actual speed of the motor, and an interface to control the on-state of the commutating element. The digital speed regulation is performed by calculating a range of correction defined as the difference between the reference speed chosen by the user and the first part of a value generated from the first counter, performing a test on the sign of the range of correction and, applying, using a second counter, a correction to the trigger of the commutating element as a function of the sign of the range of correction.

11 Claims, 2 Drawing Sheets

Voltage at the terminals of the motor is = sin wt

DEVICE TO REGULATE THE SPEED OF AN ELECTRIC MOTOR AND ITS METHOD OF OPERATION

FIELD OF THE INVENTION

This invention relates to a digital device to regulate the speed of an electric motor.

BACKGROUND OF THE INVENTION

In known digital speed regulators, a microcontroller compares the actual speed of the electric motor with a reference speed and makes, if needed, a correction to the on-state (conducting state) of the commutating element to regulate the speed as a function of a measured difference between the actual and selected reference speeds. This correction however, triggers an increase or decrease in the duration of the on-state of the commutating element corresponding to the value of the reference speed. This correction often brings about a sudden variation in speed which often manifest itself as a jerkiness or a pumping phenomena, especially at low speeds. Moreover, when large variations in the on-state of the commutating element occur, the sudden increase in voltage may cause damage to the motor.

SUMMARY AND OBJECTS OF THE INVENTION

An object of this invention is to remedy the above-mentioned disadvantages by implementing a simple, fast and very reliable digital speed regulating device.

According to the invention, the device comprises a commutating element, such as a triac, mounted in series with the motor from the terminals of an alternating electrical distribution network. The duration of the triac's on-state defines values corresponding to predetermined reference speeds. The device further comprises a tachometer having a sensor tied to the motor which emits pulses indicative of the speed of the motor. Furthermore, the device also comprises a microcontroller having an oscillator, a counter tied to at least one period of the pulses generated by the tachometer in order to calculate the actual speed of the motor, a memory containing N reference speed values ranging from a minimum speed $V_{min}$ to a maximum speed $V_{max}$, comparison means to compare between a desired reference speed and the actual speed of the motor, means to process the information generated from the comparison means, and means to convert the analyzed information to a form useful for controlling the on-state of the commutating element.

According to the present invention, the memory of the microcontroller comprises, in a first sector, an average slope value $P_x$ calculated from slope values $K_1$ to $K_n$ at predetermined points on a half period of the supply voltage waveform at the terminals of the motor. The slope values $K_1$ to $K_n$ are obtained by dividing one-half period of another alternating voltage curve into N zones, and are also obtained from an energy coefficient $A_1$ for each zone and N predetermined maximum correction values for each reference speed value. The memory of the microcontroller, in a second sector, stores values corresponding to a relative speed variation between the actual speed of the motor and the desired reference speed.

The regulating device according to the invention controls and corrects the actual speed of the motor to avoid any disturbance which could be prejudicial to the life span of the motor and the piece of mind of the user. In this matter, the motor reacts to an energy variation proportional to the on-state of the commutating element, this variation being carried out by a power regulation, and not by an angular regulation obtained by applying a predetermined on-state duration to the commutating element, thereby imposing non-ideal power on the motor.

BRIEF DESCRIPTION THE DRAWINGS

The characteristics and advantages of this invention will emerge from the description which follows, as example, in reference to the annexed drawings in which.

DESCRIPTION OF THE PREFERRED EMBODIMENTS

Figure 1:
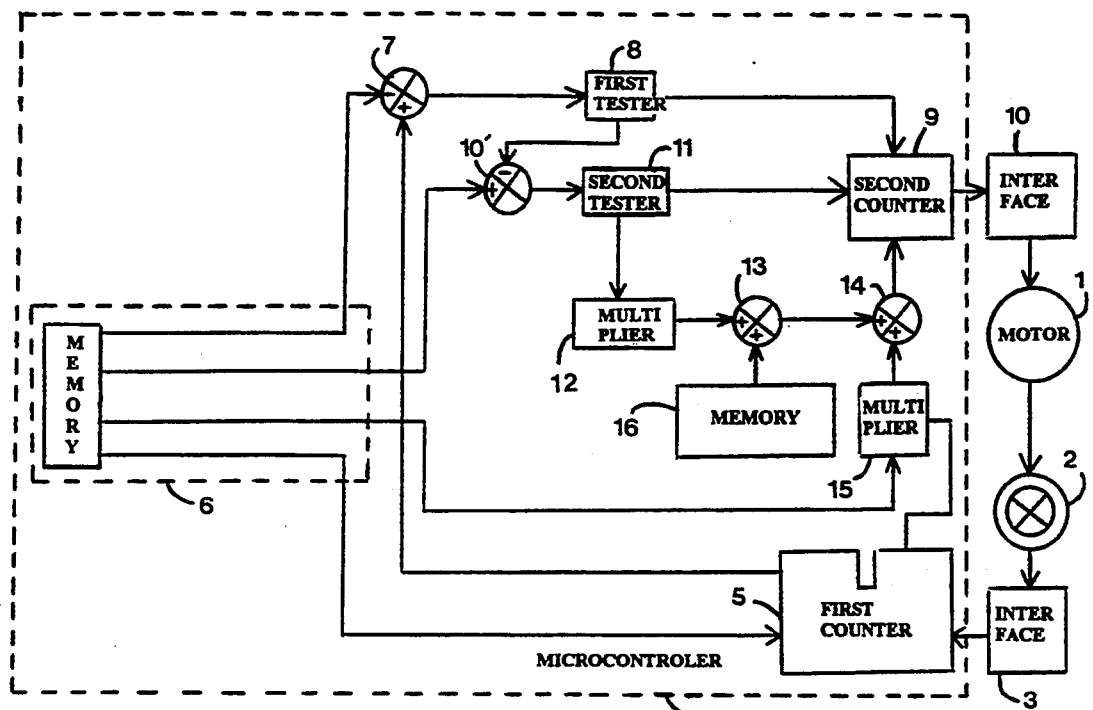
FIG. 1 represents a schematic block diagram of the digital device to regulate the speed of a motor according to the present invention.

According to FIG. 1, a motor 1 intended, for example, for a household appliance, is powered by a supply voltage and activated by commutating element connected in series with the motor. The motor turns at different speeds depending upon the task at hand, these speeds generally being selectable by the user. In this manner, the motor may undergo severe variations which may shorten its useful life. To improve the functioning of the motor and to regulate its speed, a digital motor speed regulator controls the commutating element, such as a triac, the duration of the on-state of which causes the actual speed of the motor 1 to vary. The digital regulating device according to the present invention comprises a tachometer sensor 2 sensing the rotation of the motor and emitting pulses indicative of the speed of the motor. The tachometer then transmits these pulses toward an interface 3 which, in turn, transmits the pulses to a microcontroller 4. The microcontroller 4 is, for example, an 8051 microcontroller from Intel Corp. The microcontroller comprises, for example, an oscillator having a frequency of 1 Mhz, and a memory 6 comprising, in a first sector, N reference speed values inclusive between a minimum speed $V_{min}$ and a maximum speed $V_{max}$, and an average slope value $P_x$. The average slope values $P_x$ are calculated from slope values $K_1$ to $K_n$, at predetermined points on a half period of the cosine of the voltage at the terminals of the motor for N zones obtained by dividing a half period of the sinusoid of the supply voltage, each such divided zones $Z_1$ to $Z_n$ bounded by two values $B_1$ and $B_2$, each corresponding to a predetermined duration of the on-state of the commutating element, corresponding to values $V_p$ and $V_p+1$ of desired reference speeds. The average slope values $P_x$ are also calculated from an energy coefficient $A_1$ proportional to the surface area under the sinusoidal waveform of the supply voltage from a value $V_1$ of one zone to the zero crossing of the sinusoid. It is possible to define slope values $K_2$ to $K_n$ from a half period of the sinusoid of the supply voltage, but because of sign problems, a half period of the cosine of the supply voltage is utilized instead.

Figure 2:
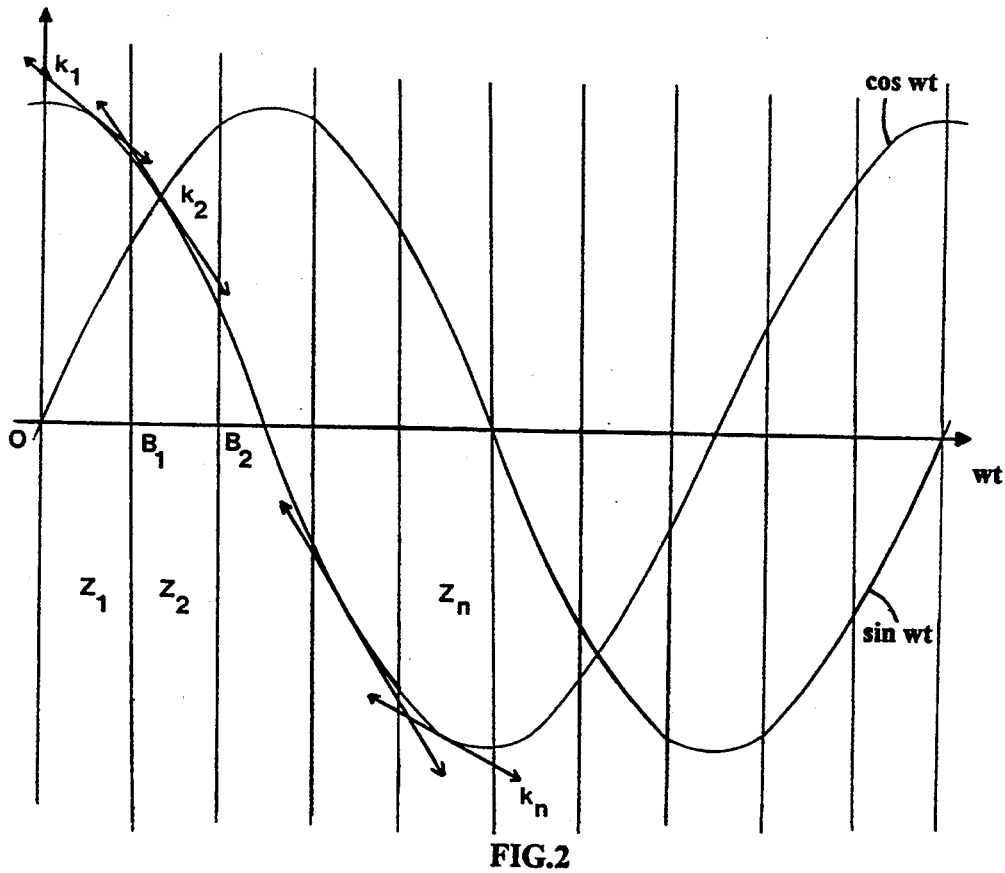
FIG. 2 illustrates the division into zones, according to the invention, of a half-period of an alternating voltage waveform present at the terminals of the electrical motor.

An illustration of this division into zones of the half period of this cosine of the supply voltage is shown in FIG. 2. In each zone, the slope values $K_1$ to $K_n$ are defined from predetermined points on the half period of the cosine of the supply voltage.

The microcontroller comprises counting means comprising a first counter 5 which increments automatically, and whose count is tied to at least one period of the pulses generated from the tachometer, to calculate the actual speed of the motor. The first counter 5 generates a value V as a function of at least one pulse issuing from the tachometer sensor 2, the number of periods that the first counter 5 must take into account in calculating the value V is stored in the memory 6 of the microcontroller and corresponds to a value of the reference speed. The value V generated from the first counter 5 is represented, for example, in hexadecimal form and comprises a first part containing more significant bits and a second part containing less significant bits. The first counter 5 is, for example, a 16-bit counter generating a hexadecimal number ranging from a minimum value of 0000 to a maximum value of FFFF. The microcontroller 4 also comprises an integrator, not illustrated, to calculate the average slope $P_x$ as a function of the slope values $K_1$ to $K_n$ and of the energy coefficient $A_1$. In this manner, for example, for two successive zones $Z_1$ and $Z_2$ containing slopes $K_1$ and $K_2$, respectively, the integrator will output a value $P_1$ corresponding to the average slope of zones $Z_1$ and $Z_2$, this example being given as non-limiting example.

The functioning of the digital electric motor speed regulating device 1 according to the present invention is controlled by the microcontroller 4. The microcontroller calculates, using a first differentiator 7, the difference between the reference speed chosen by the user and contained in the memory 6 and the first part of the value V containing the more significant bits generated by the first counter 5, the difference being called the range of correction $P_c$. After the calculation of the range of correction $P_c$, a first tester 8 determines the sign of the range of correction. If the sign of this range is negative, meaning that the motor is turning too fast, a correction is sent to the motor. This correction corresponds to a minimum variation of energy which causes a time delay $TR_{max}$ to be applied to the trigger of the commutating element. This time delay is generated by a second counter 9 having a maximum value and set to a predetermined value by a calculation of the correction minimum. This time delay is therefore equal to the difference between the maximum value of the second counter and the calculated correction corresponding to the charging value of the counter 9. The output of the second counter 9 is monitored for the presence of a signal exceeding the maximum value. This exceeding signal is stored in a storage means (not shown) which triggers an interrupt of the primary operational program of the microcontroller and triggers the running of a secondary program which, through an interface 10, sends an activation pulse to the trigger of the commutating element to correct, if needed, the speed of the motor. In such an embodiment, the second counter 9 is, for example, a 16-bit counter. The counter 9 is loaded, for example, with its maximum value FFFF to which a hexadecimal value XXXX is subtracted, the resulting difference being less than E900 and being equal to time delay $TR_{max}$. In operation, the second counter 9 begins at the value FFFF-XXXX. Then the counter increments, and upon transition from the maximum value FFFF to the minimum value 0000, the second counter emits, for example, an interrupt bit which interrupts the primary operational program and activates the secondary program which sends a pulse corresponding to a minimum power. After each activation pulse, the motor turns at a predetermined actual speed which is recalculated at each half period as a function of the desired reference speed. The time delay is recalculated as well at each half period of functioning also as a function of the desired speed. The new time delay is subtracted from the value FFFF of the second counter 9 and the same procedure is repeated. Other types of counters may of course be utilized and appropriate methods of calculation may be developed to obtain the same result without departing from the spirit and scope of the invention.

If the sign of the range of correction is positive, or if the range of correction is null, the microcontroller 4 compares, using a second differentiator 10', the range of correction calculated by the microcontroller with a maximum range of correction $T_{cm}$ contained in the memory 6, $T_{cm}$ being fixed for each desired reference speed and corresponding to the difference in speed between the actual speed and the desired reference speed of the motor, the difference being a relative variation. The second differentiator 10' generates a value called mode of correction $M_c$ on which a sign test is effectuated by a second sign tester 11. If the sign of the mode of correction $M_c$ is negative, or if $M_c$ is null, meaning that the motor is turning too slowly, a correction corresponding to a maximum power variation is sent and applied to the motor.

This correction is associated with a time delay $TR_{min}$ applied to the commutating element and the same process as described above with the time delay $TR_{max}$ is followed. In this particular example, the hexadecimal value corresponding to the time delay $TR_{min}$ is the value FFFF-FB00. If the sign of the motor correction is positive, meaning that the motor is turning at a speed close to that of the desired reference speed, a calculation is undertaken of the correction value to apply to the actual speed of the motor to make it operate at the desired reference speed. To obtain this correction value, an average slope value $P_x$ associated with the desired reference speed is multiplied, by a multiplier 12, by the value of the range of correction calculated by the first differentiator, onto which product is added, by a first summer 13, a value stored in a memory 16 below which the apparatus equipped with the motor does not perform useful functions, in our example, to a hexadecimal value E9 and, using a second summer 14, the result of the first summer 13 is added to the product calculated with the multiplier 15 which calculates the product between the value of the average slope $P_x$ associated with the desired reference speed and the second part of the value V associated with the first counter 5. This correction value calculated from the summer 14 is applied to the second counter 9.

Figure 3:
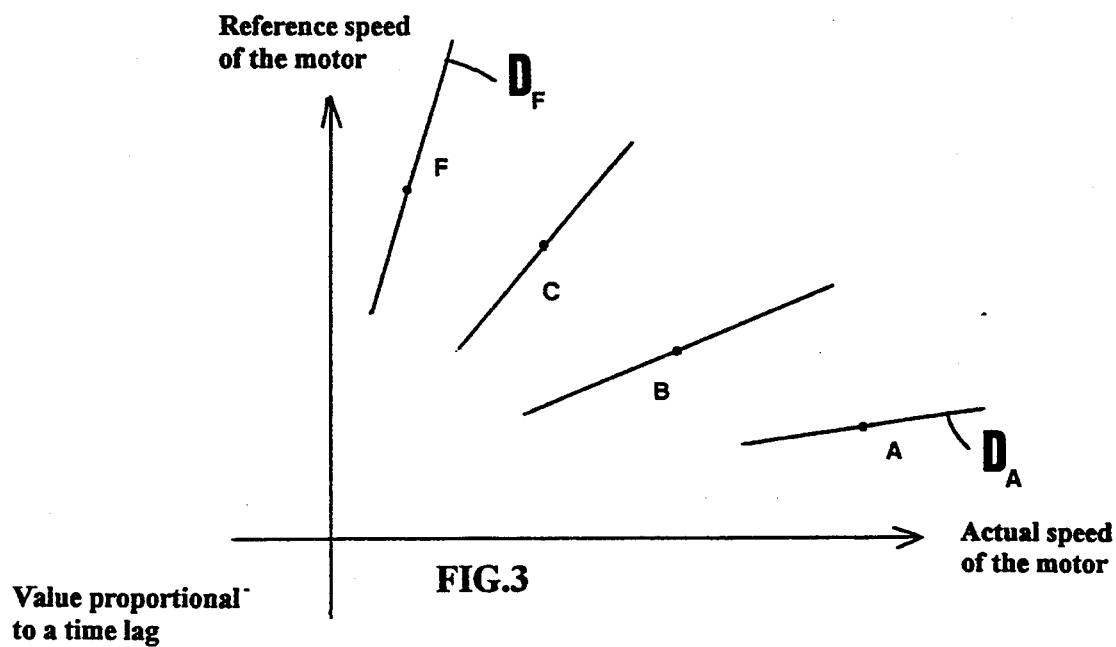
FIGS. 3 and 4 represent correction lines, obtained after a calculation made according to the present invention, to determine a correction value to bring to the actual speed of the motor to obtain the desired reference speed.
Figure 4:
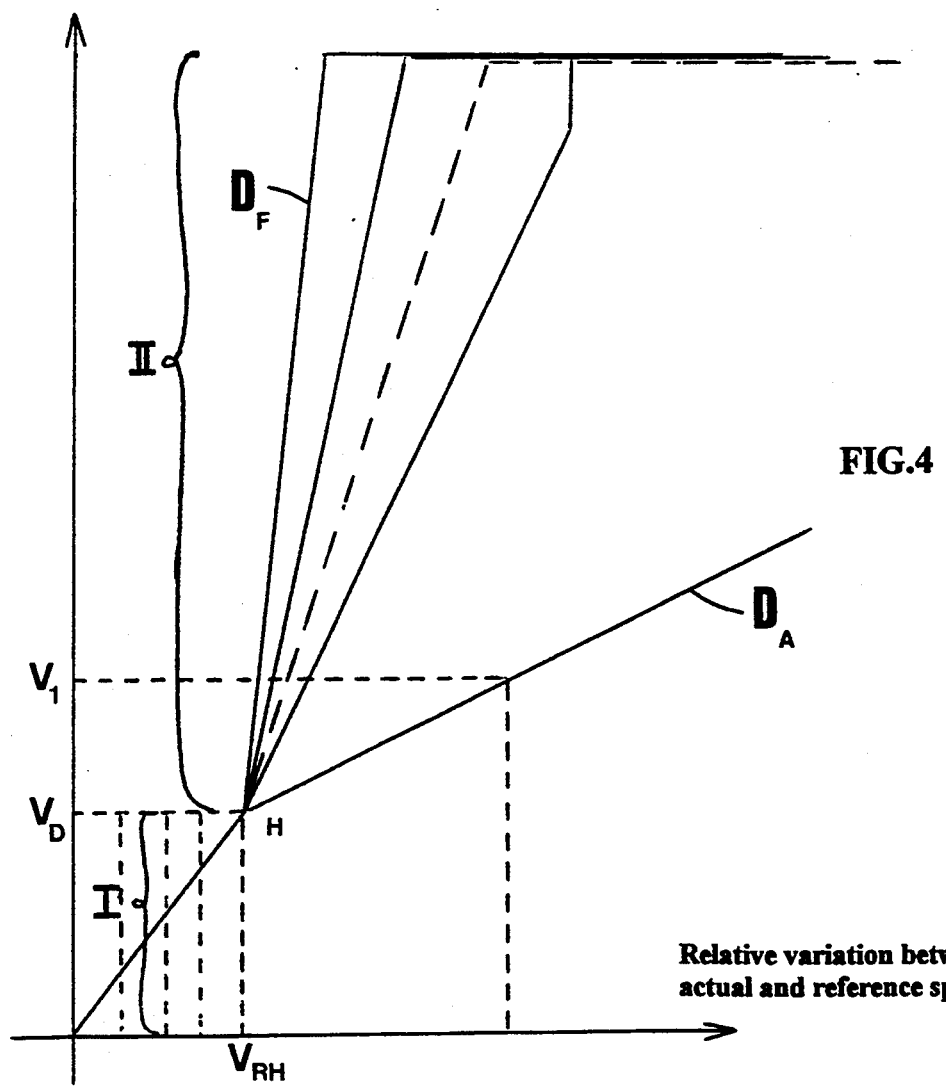

The correction value may be graphically found by referring to the correction lines represented in FIGS. 3 and 4. According to FIGS. 3 and 4, different correction lines ($D_a, \ldots n\ D_f$) have been illustrated as example, following different position points (A, B, C ..., F). Indeed, the correction lines $D_a$ to $D_f$ in FIG. 3 are defined on a coordinate system whose abscissa represents the value V generated from the first counter 5 representing the actual speed of the motor and whose ordinate represents the values of the reference speeds contained in the memory 6. Each correction line has a predetermined average slope value $P_1$ to $P_n$ which differs according to the position of points (A, B, C ..., F) that is, according to the desired reference speed. The correction line having A as position point corresponds to a small value of the reference speed and to a very high value V representing the actual speed of the motor. Accordingly, this correction line has a very gentle average slope. For higher reference speed and lower V values, the correction lines have a steep average slope.

The correction lines of FIG. 4 have the same average slopes as those represented in FIG. 3, but are represented with a change in scale to improve the correction to bring to the motor as a function of difficult to analyze small differences in speed. The correction lines are represented in a coordinate system having, as abscissa, the relative variations in speed between the actual speed of the motor and the reference speed, and, as ordinate, the value associated with the time lag, this value being converted, for example, in hexadecimal form. In FIG. 4, each correction line has a first part I common to all lines corresponding to a range wherein the motor turns rapidly, and an inflection point H, also common to all lines. In the second part II, the average slope of the correction lines vary as a function of the desired reference speed. According to the value of the desired reference speed and to the relative variation of the motor speed, a value $V_1$ proportional to a time lag is defined in hexadecimal form, using a correction line defined as a function of the average slope associated with the desired reference speed. The value $V_1$ is then transmitted to the second counter 9 which triggers the process described earlier.

In this manner, the invention ensures a responsive correction proportional to the calculation of the average slope of the correction lines.

The invention may be applied to all types of motors which undergo large speed variations upon the application of varied torques, notably to food processors in which they chop, beat, centrifuge, or pressing functions require very different speeds. This invention may be applied as well to all domestic appliances, such as, for example, a vacuum cleaner.

Modifications of the invention herein disclosed will occur to a person skilled in the art and all such modifications are deemed to be within the scope of this invention as defined by the appended claims.

I claim:

1. Digital device to regulate the speed of an electric motor 1 comprising:
   a commutating element mounted in series with the motor at terminals of an A.C. voltage distribution network, an on-state of said commutating element defining values corresponding to a desired reference speed;
   a tachometer sensor 2 connected with the motor and generating pulses indicative of the speed of the motor;
   a microcontroller 4 comprising an oscillator;
   a first counter 5 whose count is tied to at least one period of the pulses to calculate an actual speed of the motor;
   a memory 6 containing a range of N desired reference speed values, said range being inclusive between a minimum speed $V_{min}$ and a maximum speed $V_{max}$,
   comparison means for comparing the desired reference speed with the actual speed of the motor;
   means for processing information generated from said comparison means;
   conversion means for converting an output of said processing means to a form useful for controlling an on-state of said commutating element;
   said memory 6 of said microcontroller 4 comprising, stored therein, N average slope values $P_x$ calculated from said slope values $K_1$ to $K_n$ corresponding to predetermined points on a half period of said A.C. voltage waveform at terminals of said motor, said slope values $K_1$ to $K_n$ being representative of the slope of said A.C. voltage waveform within N zones $Z_1$ to $Z_n$ obtained by dividing said A.C. voltage waveform into a plurality of zones;
   said average slope values $P_x$ also being calculated from energy coefficients $A_1$ proportional to an area under said A.C. voltage waveform and, also stored in said memory 6, N maximum correction $P_{cm}$ values within a range of maximum correction values predetermined for each reference speed, said $P_{cm}$ values corresponding to a difference in speed between the actual speed of the motor and the desired reference speed.

2. Digital device to regulate the speed of an electric motor according to claim 1, wherein said slope values $K_1$ to $K_n$ measure a slope on a half period of a cosine of said A.C. voltage waveform at the terminals of the motor and said zones are defined on a half period of a sinusoid of said A.C. voltage waveform.

3. Digital device to regulate the speed of an electric motor according to claim 1, wherein a said memory 6 of said microcontroller 4 comprises a predetermined number of periods of said pulses for each reference speed.

4. Digital device to regulate the speed of an electric motor according to claim 1, wherein said memory 6 stores a value V proportional to the actual speed of the motor, said value V comprising a first part containing fewer significant bits and a second part containing more significant bits.

5. Digital device to regulate the speed of an electric motor according to claim 4, wherein said value V is stored in hexadecimal form.

6. Digital device to regulate the speed of an electric motor according to claim 1, wherein said microcontroller 4 comprises a second counter which calculates a correction value to bring to said commutating element from N average slope value $P_x$ and values $P_{cm}$, and a predetermined number of periods of said pulses in said memory 6.

7. Digital device to regulate the speed of an electric motor according to claim 1, wherein said first counter 5 and said second counter 9 are 16-bit counters.

8. Digital device to regulate the speed of an electric motor according to claim 1, wherein said device regulates the speed of a motor of a household appliance.

9. A method to digitally regulate the speed of an electric motor comprising a commutating element mounted in series with said motor at terminals of an A.C. voltage source, a duration of an on-state of said commutating element defining values corresponding to a predetermined reference speed, a tachometer sensor 2 connected with said motor and generating pulses indicative of a speed of said motor, a microcontroller 4 comprising an oscillator, a first counter whose count is tied to at least one period of said pulses to calculate an actual speed of said motor, a memory 6 containing N desired reference speed values, comparison means for comparing a desired reference speed with the actual speed of the motor, means for processing information generated from said comparison means, and conversion means to convert said processed information to control said on-state of said commutating element, said method comprising the steps of:

a) storing in said memory 6 a digital value V proportional to an actual speed of said motor, said digital value V comprising a first part containing less significant bits and a second part containing more significant bits;

b) calculating a range of correction $P_c$ defined by a difference between a reference speed chosen by the user and a first part of said value V generated from said first counter 5;

c) performing a test on a sign of said range of correction $P_c$; and d) applying, using a second counter 9, a correction to the on-state of said commutating element, said correction changing as a function of a sign of said range $P_c$.

10. Method of digitally regulating the speed of an electric motor according to claim 9, wherein a duration of said on-state is controlled by performing the steps of:

sending a minimum correction corresponding to a minimum energy variation if said sign of said range of correction is negative, and, if said sign of said range of correction is positive, comparing the range of correction $P_c$ calculated by said microcontroller 4 with a maximum range of correction $P_{cm}$ contained in said memory 6;

determining, from said comparison a value of a mode of correction $M_c$;

testing a sign of said mode of correction $M_c$ and, if said mode of correction is negative, applying a maximum correction corresponding to a maximum energy variation, and, if said mode of correction $M_c$ is positive;

calculating a product of said average slope $P_x$ associated with said desired reference speed by the value of the range of correction $P_c$ calculated by said microcontroller 4; and adding to said product a predetermined original value and a product of said average slope $P_x$ and the second part of the value V generated from said first counter 5.

11. A method of digitally regulating a speed of an electric motor according to claim 9, wherein said commutating element is triggered by performing the steps of:

loading in said second counter 9 a digital value in hexadecimal form corresponding to said correction value;

initiating a count in said second counter 9;

allowing said second counter 9 to reach its maximum value; and upon said counter 9 transitioning back to its minimum value, utilizing a carry bit generated by said counter 9 to trigger an interrupt of a primary operating program of said microcontroller 4 and triggering an activation of a secondary program which sends an activation pulse to trigger said commutating element.

* * * * *